UNITED STATES PATENT OFFICE.

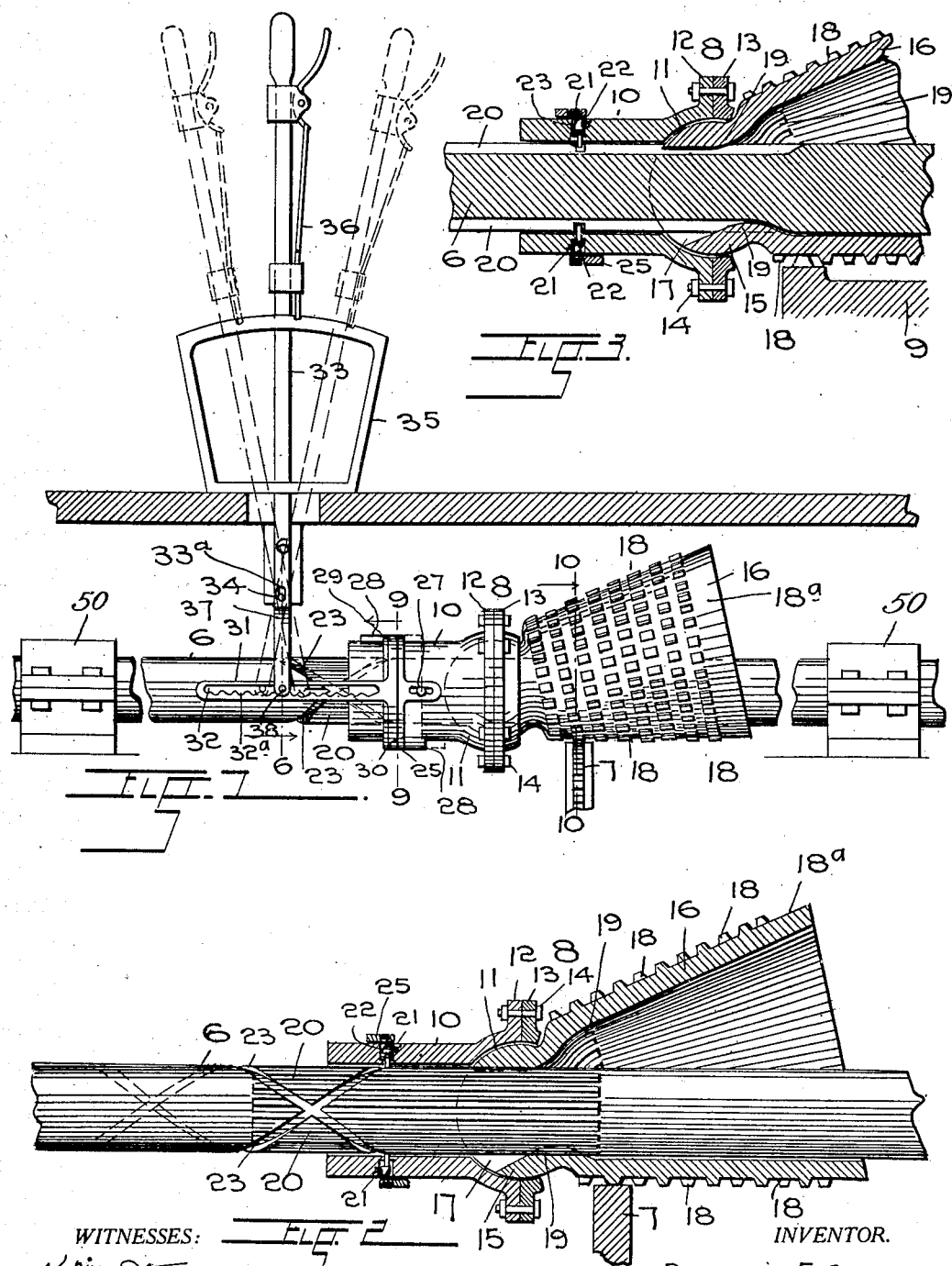

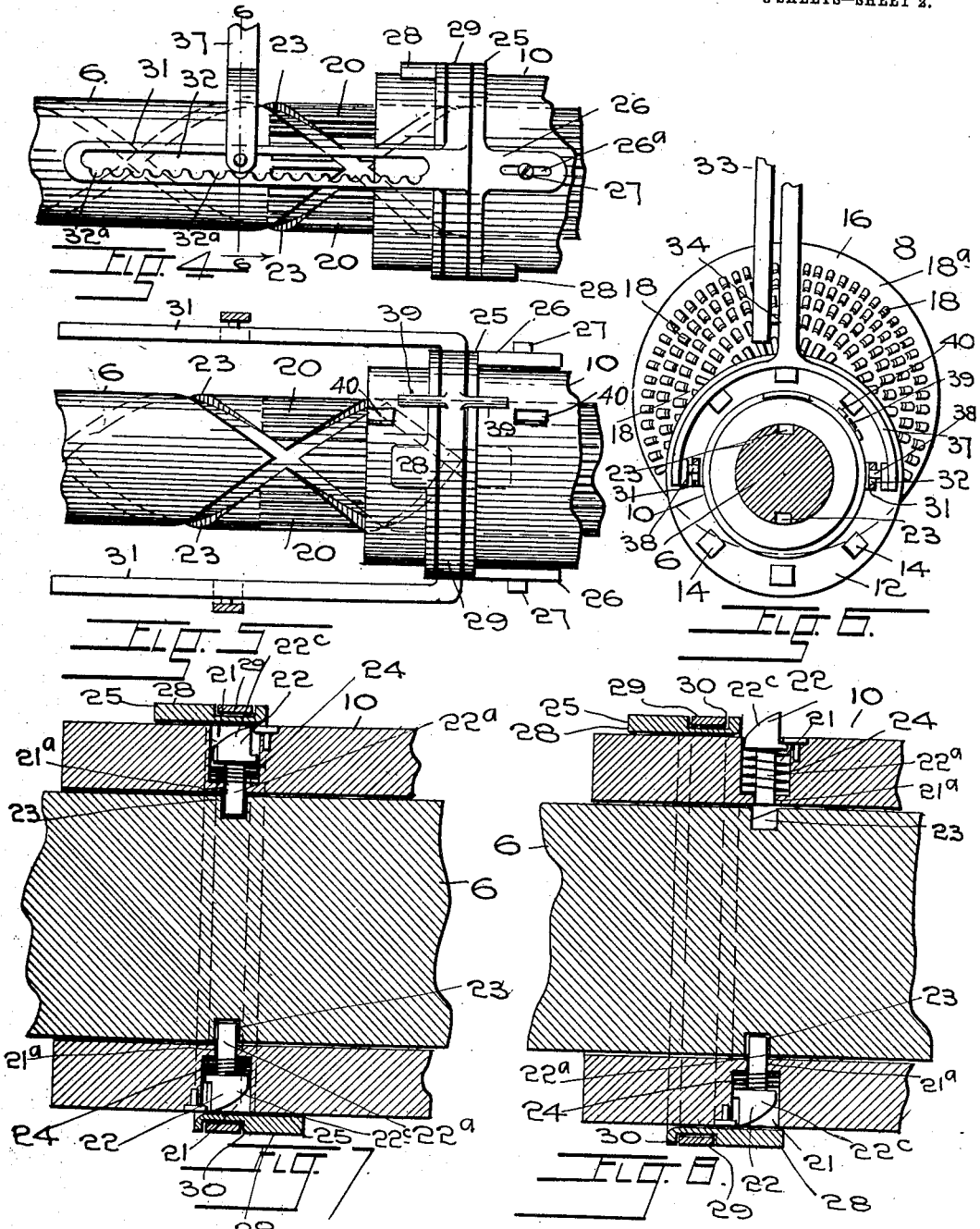

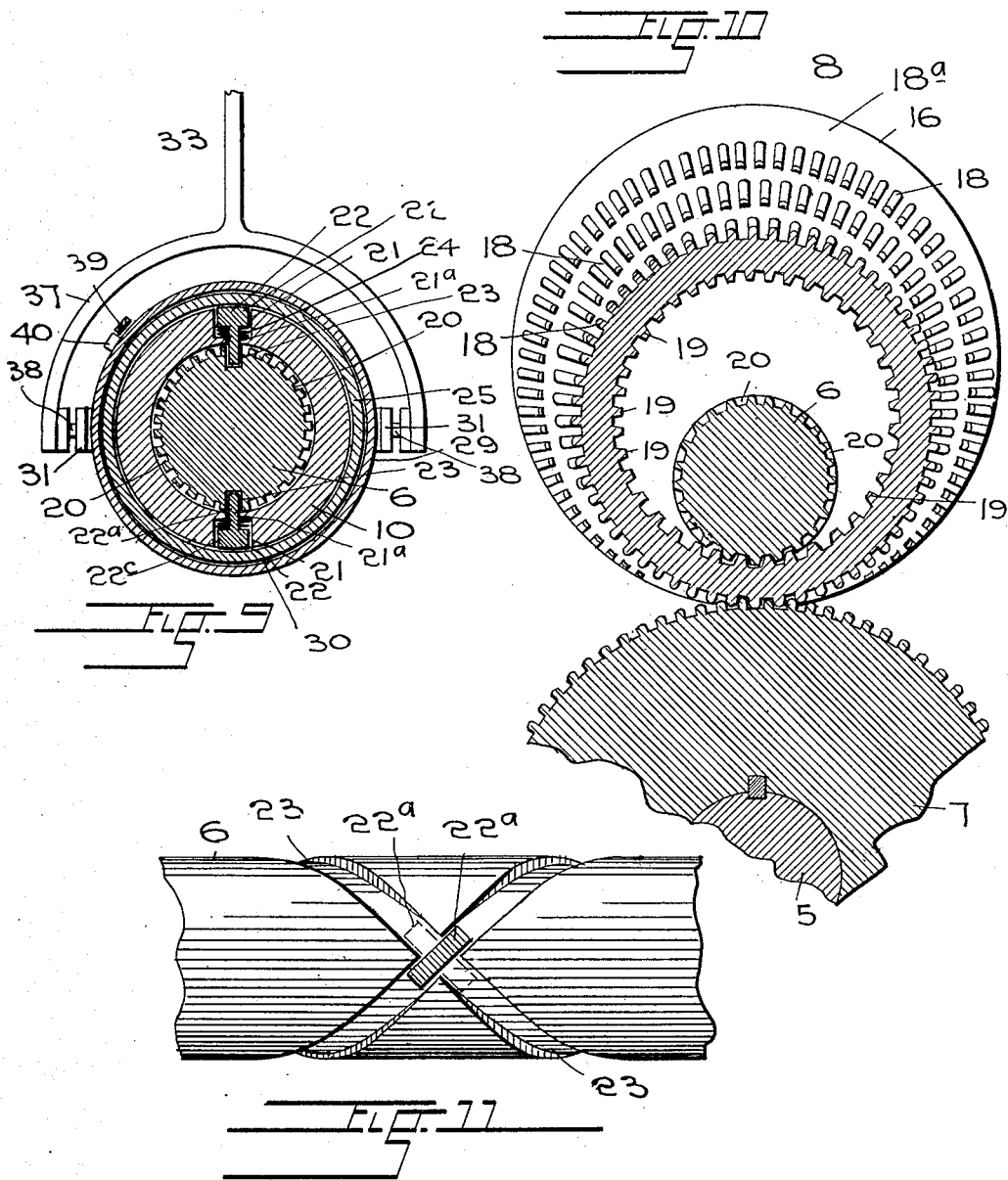

BENJAMIN F. SEYMOUR, OF DENVER, COLORADO.

TRANSMISSION MECHANISM.

No. 920,190.        Specification of Letters Patent.        Patented May 4, 1909.

Application filed December 12, 1907. Serial No. 406,193.

To all whom it may concern:

Be it known that I, BENJAMIN F. SEYMOUR, a citizen of the United States of America, residing at Denver, in the county of Denver and State of Colorado, have invented certain new and useful Improvements in Transmission Mechanism, of which the following is a specification.

This invention relates to new and useful improvements in power transmission mechanism and its object is to provide a device by the use of which the speed of a driven shaft can be varied at will within certain predetermined limits, in relation to the approximately constant velocity of a driving element.

My improved mechanism being simple in construction and efficient in operation, is of peculiar value in connection with automobiles, motor boats, air ships and other contrivances in which a gradual variation of the movement of the impelling mechanism from a low to a high speed through instrumentality of a simple and easily operated appliance, is of advantage. I attain this object by the mechanism illustrated in the accompanying drawings in the various views of which like parts are similarly designated and in which—

Figure 1— represents a side elevation of the device in connection with a horizontally mounted shaft, Fig. 2— an elevation of the said shaft showing the surrounding parts in section, Fig. 3— a longitudinal section through the shaft and the surrounding members of the appliance. Fig. 4— an enlarged fragmentary elevation of the shaft and the sleeve which forms part of the adjustable gear comprised in my invention, Fig. 5— a top view of the parts illustrated in Fig. 4, Fig. 6— a transverse section taken along a line 6—6, Fig. 1, Figs. 7 and 8,— enlarged, fragmentary, longitudinal sections through the shaft and the sleeve showing the locking mechanism in two positions, Fig. 9— a transverse section along a line 9—9, Fig. 1, Fig. 10— a cross section taken along the line 10—10, Fig. 1, and Fig. 11— a fragmentary elevation of the driven shaft illustrating the position of the locking detents in the spiral grooves formed in the peripheral surface of the shaft.

Referring to the drawings, let the reference character 5 designate the driving shaft and 6 the driven shaft of a mechanism to which my improved transmission device is applied, 7 a gear wheel mounted upon the shaft 5, and 8 a therewith operatively engaging adjustable member carried upon the shaft 6, by means of which the rotary movement of the first shaft is transmitted to the other. In this connection I wish it understood that although in the following description and claims the shafts 5 and 6 and the therewith connected gears have been designated respectively as the driving and driven elements of the apparatus, this relation may be reversed and the power applied to the shaft 6 and transmitted by means of the gear to the shaft 5 in which case the latter becomes the driven member. It should furthermore be observed that a horizontal circular gear or rack may be substituted for the shaft 5 and the gear 7, to impart motion to the member 8 and the therewith connected shaft, as is illustrated in Fig. 3 of the drawings, in which the reference numeral 9 designates the driving gear.

The adjustable element of the invention comprises a sleeve 10 which loosely surrounds the driven shaft 6 and which is formed at one of its extremities with a semispherical socket 11 and an annular flange 12 upon which a ring 13 is secured by means of bolts 14. The socket 11 is, in practice, occupied by the spherical extremity 15 of a hollow conoidal member 16 which has a central conical opening 17 through which the shaft 6 extends. The ring 13 when secured upon the flange 12 of the sleeve, prevents independent longitudinal movement of the cone 16 and the latter is free to rotate about its own imaginary axis and to gyrate about the shaft as a center.

The conoidal member is formed upon its peripheral surface with a plurality of consecutively arranged, equidistant series of teeth, 18, of even pitch, which are adapted to mesh with the correspondingly arranged teeth on the driving member 7. A smooth portion 18$^a$ of the surface of the cone extending beyond the last series of teeth at its largest or low-speed extremity, is provided for the purpose of retaining the driving element of the mechanism in engagement with the driven member without imparting motion thereto when, during the movement of the driving shaft, it is desired to stop that of the driven shaft. The conoidal member is furthermore provided with a series of longitudinally ranging grooves which being cut into its inner surface substantially at the juncture of its conical portion with its spherical extremity form a succession of projections or teeth 19 which, when the parts are assembled upon the shaft 6, project into correspondingly shaped grooves or flutes 20, cut into the peripheral surface of the latter and by which means the rotary movement of the cone is transmitted to the shaft.

Seated in sockets 21, formed diametrically opposite in the circumferential surface of the sleeve 10, are headed dogs or detents 22, the stems 22$^a$ of which project normally through apertures 21$^a$ in the bottom of the sockets, into spiral grooves 23 which being cut in the circumferential surface of the shaft 6, wind in opposite directions within predetermined limits. Spiral springs 24, which surround the stems of the detents within the socket, engage the bottom surface of the latter and the opposed lower surface of the heads 22$^c$ for the purpose of forcing the lower or engaging extremity of the detents out of the grooves they normally occupy, as is illustrated in Fig. 8 of the drawings. The lower extremity of each detent is shaped in conformity with the groove it is designed to occupy, as is shown in Fig. 11, so that when during movement of the sleeve 10, the detent traveling in the groove reaches a point of intersection of the said groove with that winding in opposite direction, it will not deviate from its course. When both the detents project into the respective grooves and the sleeve 10 is in consequence locked upon the shaft 6, they are held against outward movement by means of a collar 25, which encircling the sleeve, engages the upper surface of the heads 22$^c$.

Headed pins 27 secured in corresponding apertures in the sleeve, project through longitudinal slots 26$^a$ in laterally extending wings 26 on the collar, causing the latter to rotate with the sleeve, while they permit a limited movement of the collar thereon in lateral direction. The collar is furthermore provided at its points of engagement with the detents, with wings 28, which extend in opposite directions along the surface of the sleeve and whose function is to retain the respective detent in its depressed position when, by adjustment of the collar, the opposite dog is disengaged and in consequence released from contact with the groove in the shaft by action of the spring 24, as shown in Fig. 8 of the drawings. The movement of the collar in either direction is limited by the length of the guide slots 26$^a$ so that, when the said collar is in its extreme positions, but one of the detents is released, while the other is retained in its position in the respective spiral groove 23. By holding the member 10 against rotation, the rotary movement of the shaft may thus be employed to move the said member longitudinally in either direction, as the engagement of the depressed detent with the spiral groove will cause it to travel in the direction in which the said groove is wound and to carry the sleeve with it.

To control the movements of the sleeve and the therewith connected conoidal gear from the place occupied by the operator of the device to which my transmission mechanism is applied, I have provided a ring 29 which occupies an annular depression 30 in the circumferential surface of the collar 25 and which forms a connection between the extremities of two arms 31 which extend in parallel relation to the shaft 6 at opposite sides thereof and which are provided with longitudinally extending slots 32, the lower edges of which are formed with a series of successive notches 32$^a$.

The reference character 33 designates the operating lever which is fulcrumed at 34 upon a stationary support and which may be held in any predetermined position, upon a segmental standard 35 by means of the usual grip 36. The lower extremity 37 of the lever 33 is bifurcated to straddle the shaft 6 and is provided with inwardly ranging gudgeons 38 which project into the slots 32 of the respective arms 31 on the ring 29. The aperture 33$^a$ in the lever 33 through which the fulcrum pin projects, is elongated to permit a limited vertical movement of the lever so that when the latter is disengaged from the standard 35, the gudgeons 38 may be brought in engagement with the subjacent notches 32$^a$ in the arms 31 and the movement of the lever about its fulcrum may in consequence be transposed into a lateral movement of the ring 29 and the therewith connected collar. Two fingers 39 extending laterally from the ring 29 in opposite directions, are arranged to engage lugs 40 formed upon the sleeve 10 when the collar 25 is adjusted into one of its extreme positions, for the purpose of holding the sleeve against rotation with the shaft 6, and to thus compel its movement longitudinally in relation thereto when impelled by the engagement of one of the dogs 22 with the respective spiral groove 23 in the shaft.

Having thus described the mechanical construction of the device, its operation is as follows:—Power being applied to the driving element in a suitable manner, the rotary movement of the latter is transmitted to the conoidal gear by the engagement of their teeth and transposed into a gyratory movement of the driven member about the shaft 6 as a center, combined with a circular movement around its own imaginary axis. The movement of the conoidal gear is transmitted to the driven shaft 6 by the engagement of the teeth 19 on the one with the grooves 20 in the other, the said gear being held against longitudinal displacement on the shaft by the two detents 22 which when the lever 33 and the collar 25 are in their central or normal positions, project into the right and left grooves in the shaft and thus lock the member with which they are connected against movement in either direction. To vary the speed with which the shaft 6 rotates in its bearings 50, the operator by disengaging the operating lever from the segmental standard, lowers the gudgeons at its bifurcated extremity into the subjacent notches in the arms 31 on the ring 29, after which he moves the said lever about its fulcrum, into one of the positions, shown in broken lines in Fig. 1 of the drawings, thus causing the collar 25 to move in opposite direction upon the sleeve 10 and to consequently disengage one of the detents 22 which by action of the spiral spring 24 is forced outwardly free from contact with the spiral groove into which it projected while the parts were in their normal positions. The sleeve 10 which normally rotates with the shaft is simultaneously locked against rotation by engagement of one of the fingers on the stationary ring 29 with the respective lug on the sleeve and the latter is impelled to move along the shaft in longitudinal direction by the latter's rotary movement which causes the dog 22 engaged by the corresponding wing on the collar, to travel in the spiral groove into which it projects. When the shaft 6 has attained the desired speed, the collar 25 is returned to its normal position by manipulation of the lever 33, and by engagement with the beveled surface of the outwardly extending head of the free detent, depresses the latter into the respective groove in the shaft with the result that the sleeve and the therewith connected cone are again locked against longitudinal displacement. It will thus be observed that by moving the conoidal gear along the shaft, the driving gear may be brought in mesh consecutively with the various series of teeth on its peripheral surface and as the diameter of each series differs from that of the preceding one, the speed of the driven element will be varied in consequence. If it is desired to stop the movement of the shaft 6, the smooth portion at the large or low speed extremity of the conoidal gear, is brought in engagement with the driving gear which causes the latter to rotate idly.

Having thus described my invention what I claim is:—

1. The combination with a driving element, of a driven shaft, a sleeve encircling the latter, a conoidal member in co-active engagement with the shaft connected with the said sleeve and free to gyrate about an axis common with that of the shaft by engagement with the said element, means to move the sleeve longitudinally in relation to the shaft and to secure it thereto at any desired point within predetermined limits.

2. The combination with a driving element of a driven shaft having two grooves winding spirally in opposite directions within predetermined limits, a sleeve encircling the shaft, detents connected with the said sleeve, normally projecting into the said grooves, means to withdraw either one of the said detents from its respective groove and a hollow conoidal member in co-active engagement with the shaft, connected with the sleeve and free to gyrate about an axis common with that of the shaft by engagement with the said element.

3. The combination with a driving element of a shaft, having grooves winding spirally in opposite directions within common limits, a sleeve encircling the shaft, a conoidal member connected with the said sleeve in co-active engagement with the shaft and free to gyrate about the latter's axis by engagement with the said element, detents resiliently connected with the sleeve and normally projecting within the grooves, a collar adjustably mounted upon the sleeve and adapted to engage one or both of the detents and an operating mechanism arranged to move the said collar longitudinally in relation to the sleeve.

4. The combination with a driving element of a driven shaft having two grooves winding spirally in opposite directions within predetermined limits, a sleeve encircling the shaft, detents connected with the said sleeve, normally projecting into the said grooves, means to withdraw either one of the said detents from its respective groove and to simultaneously hold the sleeve against rotation and a hollow, conoidal member in co-active engagement with the shaft, connected with the sleeve and free to gyrate about an axis common with that of the shaft by engagement with the said element.

5. The combination with a driving element of a shaft having grooves winding spirally in opposite directions within common limits, a sleeve encircling the shaft, a conoidal member connected with the said sleeve in co-active engagement with the shaft and free to gyrate about the latter's axis by engagement with the said element, detents resiliently connected with the sleeve and normally projecting within the grooves, a collar adjustably mounted upon the sleeve and adapted to engage one or both of the detents, a non-rotative ring encircling the collar and an operating mechanism arranged to impart a lateral movement thereto.

6. The combination with a driving element of a shaft having grooves winding spirally in opposite directions within common limits, a sleeve encircling the shaft, a conoidal member connected with the said sleeve in coactive engagement with the shaft and free to gyrate about the latter's axis by engagement with the said element, detents resiliently connected with the sleeve and normally projecting within the grooves, a collar adjustably mounted upon the sleeve and adapted to engage one or both of the detents, a non-rotative ring encircling the collar, an operating device arranged to impart a lateral movement thereto, the said ring and the said sleeve having means arranged to interlock when the former is in an extreme position.

In testimony whereof I have affixed my signature in presence of two witnesses.

BENJAMIN F. SEYMOUR.

Witnesses:
G. J. ROLLANDET,
K. M. STUMP.